United States Patent
Komara et al.

[19]

[11] Patent Number: 5,926,747
[45] Date of Patent: *Jul. 20, 1999

[54] METHOD AND APPARATUS FOR DYNAMICALLY OPTIMIZING THE FORWARD-LINK TRANSMIT POWER OF A BROADBAND MULTI-CARRIER RADIO SIGNAL

[75] Inventors: Michael A. Komara, Indialantic; John R. Doner, Sebastian, both of Fla.

[73] Assignee: AirNet Communications Corp., Melbourne, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/708,690

[22] Filed: Sep. 5, 1996

[51] Int. Cl.⁶ .............................. H04B 1/00; H04B 7/00; H04B 7/216
[52] U.S. Cl. ........................... 455/69; 455/561; 455/522; 370/320
[58] Field of Search ........................... 455/69, 561, 522; 370/320, 335, 342, 479, 441, 208, 209; 375/200, 206

[56] References Cited

U.S. PATENT DOCUMENTS

| | | |
|---|---|---|
| 4,811,421 | 3/1989 | Havel et al. .............................. 455/69 |
| 5,257,283 | 10/1993 | Gilhousen et al. ......................... 375/1 |
| 5,267,262 | 11/1993 | Wheatley, III .............................. 375/1 |
| 5,305,468 | 4/1994 | Brukert et al. ............................. 455/69 |
| 5,313,658 | 5/1994 | Nakamura ................................. 455/69 |
| 5,485,486 | 1/1996 | Gilhousen et al. ...................... 375/205 |
| 5,564,074 | 10/1996 | Juntti ..................................... 455/67.1 |
| 5,590,409 | 12/1996 | Sawahashi et al. ....................... 455/69 |
| 5,669,066 | 9/1997 | Borg et al. ................................ 455/69 |

Primary Examiner—Douglas W. Olms
Assistant Examiner—David R. Vincent
Attorney, Agent, or Firm—Farkas & Manelli PLLC; Russell O. Paige

[57] ABSTRACT

In a cellular-communications base station (10), an attenuation circuit 22 sets different power levels for different ones of the forward communications channels by which the base station transmits to the mobile units (12) that it services. From the reverse-channel transmit power that a reverse-channel-power circuit 52 derives from the associated reverse-channel power that the base station receives, a forward power circuit (58) infers the level of forward-channel transmit power that will result in the mobile unit's receipt of the requisite forward-channel power. In this way, the base station (10) avoids the need to transmit full power into all of the forward channels even if it is operating in accordance with a protocol that does not explicitly inform it of the forward-channel power that the mobile unit (12) is receiving.

9 Claims, 3 Drawing Sheets

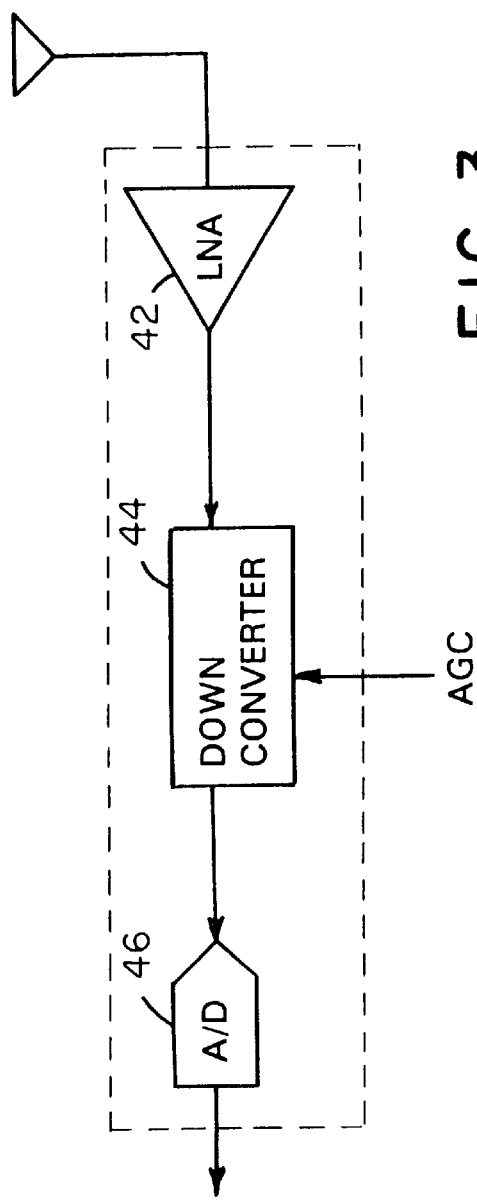
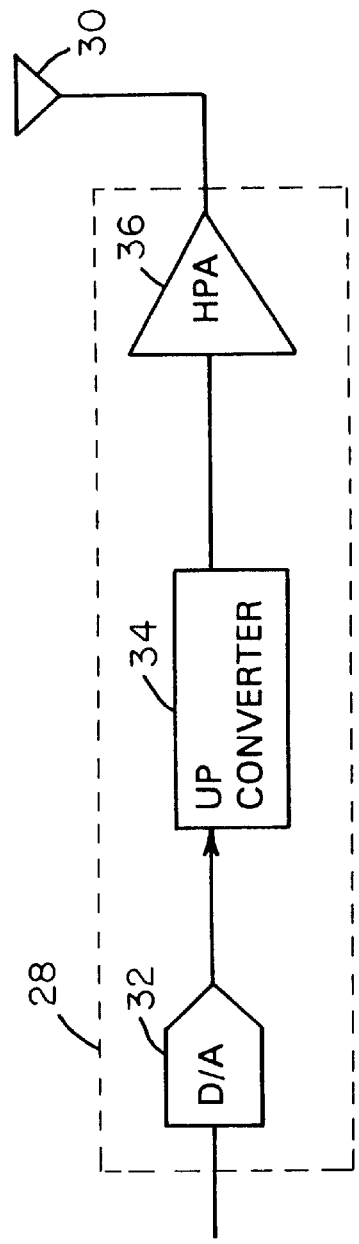

METHOD AND APPARATUS FOR DYNAMICALLY OPTIMIZING THE FORWARD-LINK TRANSMIT POWER OF A BROADBAND MULTI-CARRIER RADIO SIGNAL

BACKGROUND OF THE INVENTION

The present invention is directed to cellular communications systems and in particular to ways of controlling such systems' wireless-transmission power.

We hereby incorporate by reference commonly assigned co-pending U.S. patent application Ser. No. 08/146,364 now U.S. Pat. No. 5,535,240 of Carney et al. for a TRANSCEIVER APPARATUS EMPLOYING WIDEBAND FFT CHANNELIZER AND INVERSE FFT COMBINER FOR MULTI-CHANNEL COMMUNICATION NETWORK, which was filed on Oct. 29, 1993, and describes an advantageous arrangement of cellular-telephone-system base-station receiver and transmitter circuitry. That arrangement contributes to hardware savings because it provides a way of sharing different channels' signal processing in common hardware. It generates a digital signal that is a composite of a plurality of frequency-division-multiplexed digital channel signals. Several channels' radio-frequency signals can be generated from that one composite signal by a single conversion to analog form and translation to the radio frequency, and a common power amplifier can amplify the result for transmission. This can yield significant savings.

Savings result not only because a single power amplifier replaces the many amplifiers respectively dedicated to individual channels but also because the total power capacity for a single power amplifier need not be as great as that for many individual-channel power amplifiers. Although given cell design dictates the power that a base station must be able to transmit into all wireless channels, it does not follow that the power of which a common power amplifier must be capable equals the product of that power level and the number of cell channels; it is highly unlikely that all mobile stations in a given cell will be so positioned as to require that the base station transmit maximum power to all of them simultaneously. So if the base station transmits into each channel only the power necessary to reach that channel's mobile unit, one can limit the installed power capacity for a given cell. This can be accomplished by simply having the mobile unit report to the base station the power level that the mobile is receiving, and the base station can then simply adjust the power that it transmits into that channel until the mobile station reports that it is receiving a target power level. Since it is a feature of certain cellular-telephone communications protocols that the mobile station monitors the power level of its received signal and reports that level to the base station as part of the protocol control information, the power that the base station transmits into each channel can readily be optimized when such protocols are employed.

However, not all cellular-communications protocols provide for the mobile station to inform the base station of the received forward-channel power, i.e., the power transmittal from the base station to the mobile unit, as opposed to the reverse-channel power transmitted from the mobile unit to the base station. In the absence of this information, base stations conventionally transmit into all forward channels with maximum power, so installed capacity cannot be reduced.

SUMMARY OF THE INVENTION

We have found a way of optimizing the forward-channel transmission power even for protocols in which the mobile station does not report the received forward-channel power. Instead of having the mobile station monitor the forward-channel transmission power, we have the base station infer the proper forward-channel transmission power from the power that it receives from the corresponding reverse channel.

Since many mobile units are subject to severe energy-storage limitations, all protocols require that the base station monitor the reverse-channel power and direct the mobile unit to limit its output to a level that will result in the base station's receiving the minimum acceptable reverse-channel power. Although the forward and reverse channels' frequencies and thus their instantaneous channel attenuations typically differ significantly, the two channels' attenuations tend to be roughly equal on an average basis. In accordance with the invention, the base station takes advantage of this relationship to optimize the power with which it transmits into the forward channel.

Specifically, since the base station is controlling the power at which the mobile unit transmits into the reverse channel, it "knows" what that reverse-channel transmit power is, and it employs a forward-channel transmit power that tracks the reverse-channel transmit power, typically with an offset so that the forward-channel transmit power exceeds the reverse-channel transmit power by enough to compensate for the mobile unit's usually higher noise figure.

BRIEF DESCRIPTION OF THE DRAWINGS

The invention description below refers to the accompanying drawings, of which:

FIG. 2 is a more-detailed block diagram of FIG. 1's receiver input circuit;

FIG. 3 is a more-detailed block diagram of FIG. 1's transmitter output circuit.

DETAILED DESCRIPTION OF AN ILLUSTRATIVE EMBODIMENT

Figure 1:
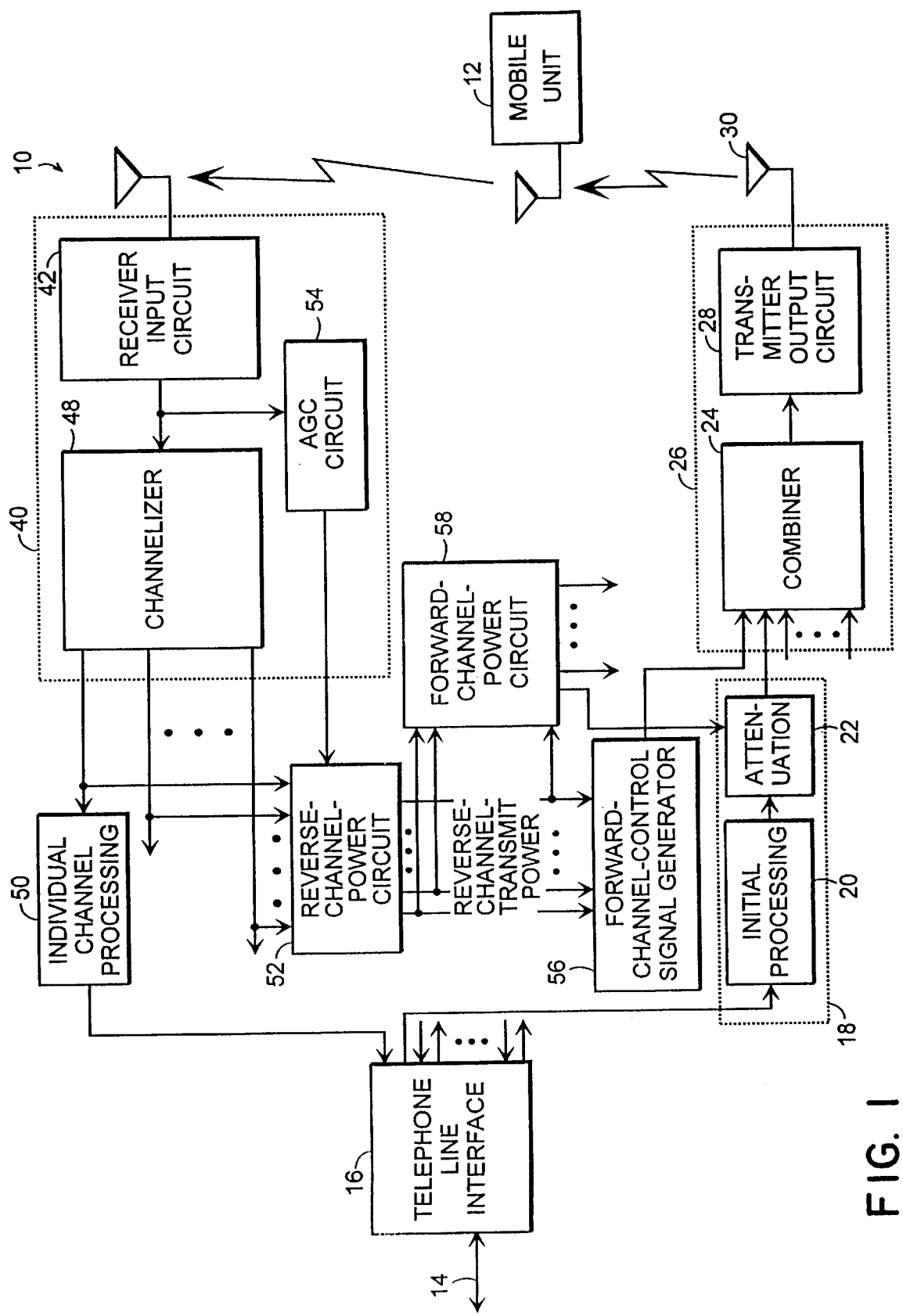
FIG. 1 is a block diagram of a mobile cellular-telephone unit and a cellular-telephone base station that employs the present invention's teachings.

A base station 10 depicted in FIG. 1 employs the present invention's teachings in communicating with a number of mobile telephone units such as mobile unit 12. It receives telephone signals by way of a number of telephone channels 14, and appropriate interface circuitry 16 applies the signals from a given channel to a respective one of a plurality of individual-channel processing units such as unit 18. A typical installation will embody each unit 18 in a separate respective digital-signal-processing integrated circuit, but the present invention does not require such a hardware segregation.

For purposes of explanation, FIG. 1 divides the individual-channel processing of unit 18 into initial processing steps 20 and a subsequent attenuation step 22, described in more detail below, whose function is channel-by-channel control of the power by which the base station 10 transmits signals to mobile units such as 12. The preset invention is not concerned with the type of initial processing 20 that the system employs, but it typically will include various signal-processing operations such as re-sampling, preemphasis, and phase modulation. Its typical output is a digital analytic baseband signal, and the attenuation operation 22 is a simple multiplication performed either in the same digital-signal-processing hardware that performs the initial processing 20 or in subsequently employed hardware, such as that which performs the function of a combiner 24.

The combiner 24 is part of transmitter circuitry 26 whose purpose is to transmit the signals from a plurality of individual-channel processing units such as unit 18 into respective wireless forward channels, i.e., channels whose signals the base station transmits and the mobile unit receives. Conceptually, the combiner frequency-translates each of the (relatively low-sample-rate) individual channel processing-unit output signals by a different frequency offset so that their spectra do not overlap, interpolates those signals to a sample rate great enough to contain all the channels' information, and adds the different channels' interpolated signals together to produce a single high-sample-rate digital output sequence whose bandwidth is roughly the product of the number of channels and the individual-analytic-baseband-signal bandwidth. In actuality, these frequency-translation, interpolation, and addition functions are not performed separately in that order, although the result is exactly the same as if they were. Instead, a fast-Fourier-transform-based filter bank combines these functions differently so that it can achieve economies by processing all of the channel signals in common. A transmitter output circuit 28 responds by applying a corresponding composite radio-frequency signal to an antenna 30 for wireless signal transmission to mobile unit 12 and the mobile units associated with the other wireless channels.

More particularly, a digital-to-analog converter 32 (FIG. 2) in the transmitter output circuit 28 converts the composite digital signal to analog form, and an up converter 34 translates the resultant analog signal in frequency to the frequency band employed for the wireless forward channels. A common high-power amplifier 36 then boosts the composite signal to the power with which it drives the antenna. That is, a common power amplifier 36 performs power amplification for all of the forward channels, just as a common digital-to-analog converter 32 and common up converter 34 perform their respective functions for all channels. Even though the digital-to-analog converter 32 must operate much faster than each digital-to-analog converter would need to if the several channels' signals were digitized separately, and even though the up converter 34 must operate at a higher power and over a wider bandwidth than a corresponding-function individual-channel circuit would, this use of common hardware affords cost and size advantages.

This is true of common power amplifier 36 in particular. Although its use clearly reduces part count, it may seem to exact a power penalty, since it must operate as a class A or linearized class A/B amplifier in order to avoid intermodulation, whereas individual-channel power amplifiers can avail themselves of the advantages of class C operation. But this penalty is largely illusory, since separate-channel power amplifiers must drive the antenna through isolation filters, which are characterized by high insertion loss if, as is common, the channels' frequency spacing is narrow. A common amplifier requires no such filter.

A further advantage of using a common power amplifier is that the total power capacity need not be as great as it would be if the transmitter employed separate power amplifiers. In any channel, the mobile unit with which the base station communicates may be located at or near the cell boundary, and the base station must therefore use maximum transmitted power to reach it. Consequently, all individual-channel power amplifiers must have that maximum-power capacity, and the installed power capacity must equal the product of the number of channels and the maximum forward transmit power per channel.

Although any channel can at some time require the maximum forward transmit power, it is highly improbable that all channels will require maximum forward transmit power simultaneously, so the system does not have to be designed for such an eventuality. This means that a common amplifier can be designed to a transmit-power capacity much lower than the product of the number of channels and the maximum power per channel. But the system designer can avail himself of this capability only if the system can dynamically determine the transmit power that will yield the desired received power at the mobile unit. And not all cellular-communication protocols notify the base station of the power that the mobile unit receives. As will become apparent below, however, the present invention determines the appropriate transmit power level even when it operates under such protocols.

We now turn to the base station's receiver 40 (FIG. 1), which includes a receiver input circuit 42 for performing initial processing. Typically, the input circuit includes a wideband low-noise amplifier 42 (FIG. 3), which amplifies a composite wideband signal containing the separate-frequency signals from a plurality of mobile units and applies it to a down converter 44 for translation to a wide-base-band signal that a fast analog-to-digital converter 46 can sample conveniently. A channelizer 48 (FIG. 1) receives the resultant digital signal, which is a composite signal that contain contains different channels' individual signals in different frequency bands and converts that composite digital signal to individual analytic baseband signals associated with the respective channels. Respective individual-channel processing units exemplified by unit 50 then perform demodulation and any other necessary processing before applying the results to the telephone-line interface 16.

As the transmitter 26 does, the receiver 40 performs processing for all of the channels in common, and it is only after the individual-channel components have been translated to a common, baseband spectrum that they are subjected to separate individual-channel processing, which block 50 represents for one of the channels. But the receiver circuitry may nonetheless be duplicated for diversity purposes. Two identical receiver circuits could receive signals from different antennas so as to ameliorate multipath effects, for instance, and each of the individual-channel processing circuits 50 would receive a corresponding channel signal from both, generating its output by appropriately combining the two signals or selecting between them.

Now, if the mobile unit 12 is near the cell boundary, it must transmit a relatively high-power reverse-channel signal to insure proper reception at the base station. Because mobile-unit energy storage (battery power) is typically at a premium, it is important that the mobile unit not be required to transmit at this high power level unnecessarily. For this reason, it is conventional for the base station to include some type of reverse-channel-power circuitry 52 (typically implemented as software in a controlling micro-processor) in order to request that the mobile unit transmit only at the power level actually needed. The reverse-channel-power circuitry 52 monitors the individual received reverse-channel signals' power levels and determines for each reverse channel a power level at which the associated mobile unit should transmit. It does this by increasing the requested reverse-channel transmit power if the received reverse-channel power is too low, and it decreases the requested reverse-channel transmit power if the received reverse-channel power is too high.

The base station sends the various mobile units requests for the thus-determined power levels by way of a common forward control channel, which all mobile units monitor, or by in-band signaling over the dedicated voice channel. FIG. 1's block 56 represents the circuitry for generating this signal, which may be separately transmitted or, as FIG. 1 indicates, processed in common with the various channel signals.

Most receiver circuits employ some kind of automatic gain control, which FIG. 1 presents as an automatic-gain-control circuit 54. Again, FIG. 1 segregates the functions in a way that is most convenient for purposes of explanation, but the separate functions are not necessarily provided by separate hardware, and the automatic-gain-control signals may be generated by, for instance, some of the same hardware that performs the function of the channelizer 48. To reduce the dynamic range of the transmitter input circuit 42's output, an automatic-gain-control circuit 54 controls the input circuit 42's gain in response to the magnitude of that output. It typically does this by controlling the gain of one or more stages of the down converter 44 (FIG. 3). So the reverse power circuit 52 cannot infer any reverse channel's absolute power simply from monitoring the corresponding relative output of the channelizer 48; it must also take into account the input circuit 42's gain, and it monitors the automatic-gain-control circuit's output for this purpose.

Now, the base station is able to specify the absolute reverse-channel transmitted power because it is positioned to sense the reverse-channel received power. In contrast, the base station is not positioned to sense the forward-channel received power by the mobile unit 12, so conventional systems employed with protocols in which the mobile unit 12 does not report this information to the base station 10 have been constrained to transmit the maximum power into all forward channels. But we have recognized that appropriate forward-channel transmit-power levels can be derived from the reverse-channel signal power. Specifically, although the forward and reverse channels are typically separated in frequency by, say, 45 MHz and therefore are quite independent in terms of multipath fading, the average attenuations in the two channels are approximately equal. So one can infer the necessary forward-channel transmit power from the transmit power specified for the reverse channel.

Figure 4:
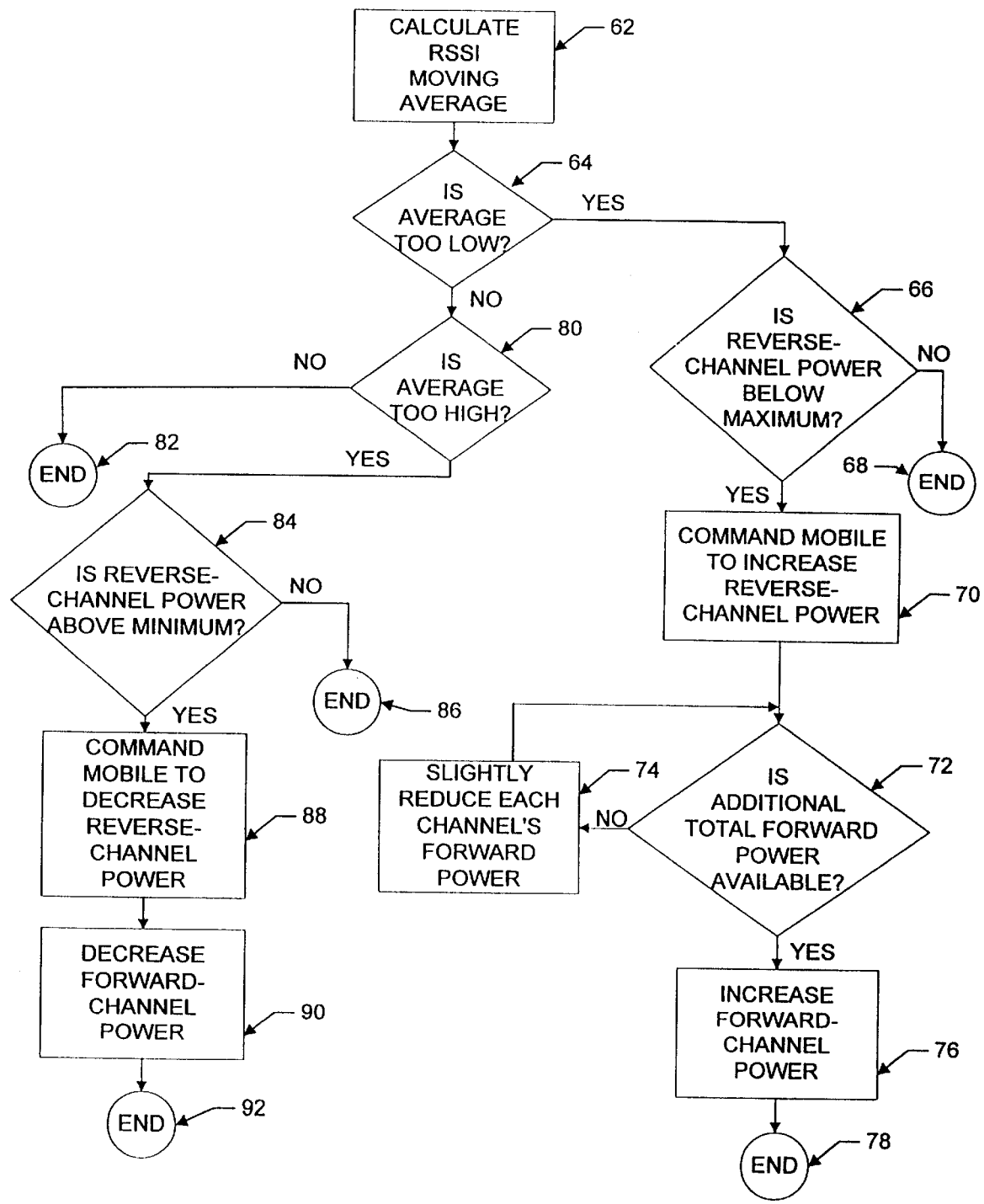
FIG. 4 is a flow chart that describes the method used by the illustrated embodiment to set the forward-channel transmit power for a single channel.

This is the function of a forward-channel power circuit 58, which generates an attenuation signal for each channel and applies it to the attenuation circuit 22. The attenuation circuit multiplies each channel signal by the appropriate attenuation value to achieve the proper forward transmit power in the corresponding wireless forward channel. FIG. 4 shows how the forward- and reverse-channel power circuits 58 and 52 cooperate to achieve this result. (Again, although it is convenient to represent the individual-channel processing 50, the reverse-power circuitry 52, and the forward-power circuitry 58 by separate blocks in FIG. 1, they will typically be embodied in a common digital-signal-processing circuit.)

From each of the channels, the reverse-power circuit 52 obtains a receive-signal-strength indication ("RSSI"), which is the relative value of that channel's channelizer output signal. The reverse-power circuit 52 adds the automatic-gain-control attenuator setting to this value to obtain an absolute RSSI level for each channel. Roughly speaking, the reverse-channel power circuit 52 requests such a reverse-channel transmit power as to cause this absolute RSSI value to assume a predetermined optimum value.

But the power of a radio-frequency signal in a mobile-unit environment can vary widely from reading to reading as a result of multipath and other effects, and this rapid changing could result in unnecessarily frequent switching of the requested reverse-channel transmit power. To avoid this, we average the absolute RSSI value over a number of readings. That is, if $R_n$ is the nth RSSI value, we base the reverse (and forward) transmit powers on an average value $P_n$:

$$P_n = \frac{1}{N} \sum_{n-N+1}^{n} R_k,$$

where N is the number of readings over which the average is taken.

FIG. 4's block 62 represents calculation of this average. This is a simple windowed average, but one could instead use some other type of average, such as an exponential average:

$$P_n = \frac{1}{1+a}(R_n + aP_{n-1}).$$

We have found that the moving average's prevention of unnecessary switching can be enhanced by employing a slope-limiting version of this process. Specifically, if the current value $R_n$ differs by more than a predetermined maximum difference from the previous absolute RSSI value $R_{n-1}$, we replace it by a value that differs from the previous one by only that predetermined maximum difference.

If the value thus calculated indicates that the received signal is too low, control circuitry not shown determines whether the reverse-channel power currently being requested is below the maximum that the mobile unit can be requested to transmit. If not, the mobile unit cannot be directed to increase its reverse-channel transmit power, so the routine of FIG. 3 ends, as blocks 64, 66, and 68 indicate, and the base station typically hands the mobile unit off to an adjacent cell. Otherwise, the reverse-channel-power circuit 52 (FIG. 1) increases the reverse-channel transmit power that it requests of the mobile unit 12, as block 70 indicates.

If step 70 has been reached, it was necessary to increase the reverse-channel transmit power in order to obtain the desired reverse-channel receive power; the reverse-channel attenuation has increased. We infer from this that the forward-channel attenuation has, too, so we need to increase the forward-channel transmit power. This forward-channel transmit-power increase is performed so that the forward-channel transmit power tracks the reverse-channel power that the base station directs the mobile unit to generate. In most embodiments, the forward-channel transmit power will track the reverse-channel transmit power with an offset; the forward-channel transmit power should usually exceed the reverse-channel transmit power by, say, 5 dB to compensate for the typically higher mobile-unit noise FIGURE and for the antenna diversity gain of the base station.

But before the forward power circuit 58 increases that channel's transmit power (by reducing the corresponding channel's attenuation in attenuation circuit 22), the base station must determine whether the power capacity of the high-power amplifier 36 (FIG. 2) has been reached. It can determine this by simply adding the output powers associated with the attenuation levels that the forward power circuit is currently specifying for all of the forward channels. Environmental and other factors can cause drift in the relationship between the transmitter power and the specified attenuation levels, so the system typically allows some margin to accommodate such drift. Alternatively, system performance can be further optimized by using a radio-frequency-power sensor to determine absolute composite transmitter power.

In either case, if the amplifier's rated output power has already been reached, the forward-power circuit 58 reduces each forward channel's transmit power slightly, as FIG. 3's blocks 72 and 74 indicate. With this reduction in the other channels' output powers, the power amplifier's total power output is brought below its rated power, further transmit power is allocated to the channel that needs it, and the routine has thereby been completed, as blocks 76 and 78 indicate, to be performed again when the time arrives for the next RSSI reading. Of course, this total-power reduction can instead be achieved by reducing the transmit power in less than all of the channels.

As blocks 64, 80, and 82 indicate, the base station makes no transmit-power adjustment to either channel if the average power computed from the RSSI measurements is neither too high nor too low. Even if it is too high, no adjustment is made if the mobile unit's reverse-channel transmit power is already at its lowest setting, as blocks 84 and 86 indicate. Otherwise, the reverse-power circuit 52 and forward-power circuit 58 cause the respective increases in the reverse- and forward-channel transmit powers, as blocks 88, 90, and 92 indicate.

The foregoing description demonstrates that employing the present invention's teachings enables the reduced-capacity-requirement potential of common processing circuitry to be fully achieved even in base stations required to operate in accordance with a protocol that does not explicitly inform the base station of the forward-channel power that the mobile units receive. It thus constitutes a significant advance in the art.

We claim:

1. A cellular-telephone base station comprising:
   A) a base-station receiver for monitoring reverse-channel signals in a plurality of reverse radio channels respectively associated with different forward radio channels;
   B) a forward-power circuit responsive to the base-station receiver for determining, for each of the forward radio channels, a forward power level as a function of the power of the reverse-channel signals that the base-station receiver monitors in the reverse radio channel associated with that forward radio channel and as a function of an average of a plurality of attenuation values of the plurality of reverse radio channels; and
   C) a base-station transmitter including a common power amplifier that generates a plurality of forward-channel signals by amplifying a composite signal comprising composite-signal components whose amplification by the common amplifier results in respective ones of the plurality of forward-channel signals, said base station transmitter responsive to the forward-power circuit, for simultaneously transmitting said plurality of respective forward-channel signals in the forward radio channels at the forward power levels respectively determined therefor by the forward-power circuit.

2. A cellular-telephone base station as defined in claim 1 wherein the forward-power circuit determines the forward power level for a given forward radio channel as a function additionally of the power of the reverse-channel signals that the base-station receiver monitors in reverse radio channels associated with other forward radio channels.

3. A cellular-telephone base station as defined in claim 2 wherein the forward-power circuit limits the total of the forward power levels that it determines for all of the forward radio channels to a predetermined forward-power maximum.

4. A cellular-telephone base station as defined in claim 3 wherein:
   A) the receiver includes a receiver input circuit responsive to the reverse-channel signals for amplifying the reverse-channel signals to produce a receiver composite output that includes individual-channel components associated with respective reverse radio channels and respectively resulting from the reverse-channel signals therein;
   B) the receiver further includes an automatic-gain-control circuit responsive to the receiver composite output for generating and applying to the receiver input circuit an automatic-gain-control signal that it determines as a function of the power of the receiver composite output;
   C) the gain with which the front-end circuit amplifies the reverse-channel signals is a function of the automatic-gain-control signal; and
   D) the forward-power circuit determines the forward power level for each forward radio channel as a function of the automatic-gain-control signal and the individual-channel component associated with the reverse radio channel associated with that forward radio channel.

5. A cellular-telephone base station as defined in claim 2 wherein:
   A) the cellular-telephone base station further includes a reverse-power circuit responsive to the base-station receiver for determining from the power of the reverse-channel signals that the base-station receiver monitors in each reverse radio channel a respective reverse-channel transmit power level at which mobile units should transmit in that reverse radio channel; and
   B) the forward-power circuit determines the forward power level for each forward radio channel as a function of the reverse-channel transmit power level determined for the reverse radio channel associated therewith.

6. A cellular-telephone base station as defined in claim 1 wherein:
   A) the cellular-telephone base station further includes a reverse-power circuit responsive to the base-station receiver for determining from the power of the reverse-channel signals that the base-station receiver monitors in each reverse radio channel a respective reverse-channel transmit power level at which mobile units should transmit in that reverse radio channel; and
   B) the forward-power circuit determines the forward power level for each forward radio channel as a function of the reverse-channel transmit power level determined for the reverse radio channel associated therewith.

7. A cellular-telephone base station as defined in claim 1 wherein the cellular-telephone base station interprets no signal from any mobile unit as indicating a measurement by the mobile station of the power level of any signal that the mobile unit receives from the base station.

8. A cellular-telephone base station as defined in claim 1 wherein the base-station transmitter includes a common power amplifier that generates the forward-channel signals by amplifying a composite signal comprising composite-signal components whose amplification by the common amplifier results in respective ones of the forward-channel signals.

9. A cellular-telephone communications method comprising the steps of:
   A) monitoring reverse-channel signals in a plurality of reverse radio channels respectively associated with different forward radio channels;

B) determining, for each of the forward radio channels, a forward power level as a function of the power of the reverse-channel signals monitored in the reverse radio channel associated with that forward radio channel and as a function of an average of a plurality of attenuation values of the plurality of reverse radio channels;

C) generating a plurality of forward-channel signals by amplifying a composite signal comprising composite-signal components whose amplification by the common amplifier results in respective ones of the plurality of forward-channel signals; and D) simultaneously transmitting said plurality of respective forward-channel signals in the forward radio channels at the forward power levels respectively determined therefor.

* * * * *